(12) United States Patent
Wang et al.

(10) Patent No.: US 10,045,658 B2
(45) Date of Patent: Aug. 14, 2018

(54) HOT BEVERAGE MAKER

(71) Applicant: ELEC-TECH INTERNATIONAL CO., LTD., Guangdong (CN)

(72) Inventors: Tony Wang, Guangdong (CN); Yan Xiong, Guangdong (CN)

(73) Assignee: ELEC-TECH INTERNATIONAL CO. LTD., Guangdong (CN)

( * ) Notice: Subject to any disclaimer, the term of this patent is extended or adjusted under 35 U.S.C. 154(b) by 831 days.

(21) Appl. No.: 14/338,576

(22) Filed: Jul. 23, 2014

(65) Prior Publication Data
US 2015/0082990 A1    Mar. 26, 2015

(30) Foreign Application Priority Data
Sep. 22, 2013   (CN) .......................... 2013 2 0585049

(51) Int. Cl.
| *A47J 31/46* | (2006.01) |
| *A47J 31/54* | (2006.01) |
| *A47J 31/56* | (2006.01) |
| *F24H 1/00*  | (2006.01) |
| *F24H 1/08*  | (2006.01) |
| *F24H 1/10*  | (2006.01) |

(52) U.S. Cl.
CPC ............... *A47J 31/56* (2013.01); *A47J 31/46* (2013.01); *F24H 1/0018* (2013.01); *F24H 1/102* (2013.01)

(58) Field of Classification Search
USPC .............. 99/300, 302 R, 305, 306, 315, 295; 392/450
See application file for complete search history.

(56) References Cited

U.S. PATENT DOCUMENTS

| 2,783,703 | A  | * | 3/1957  | Brown ..................... A47J 31/56 137/268 |
| 4,143,589 | A  | * | 3/1979  | Weber ..................... A47J 31/32 99/282 |
| 4,944,217 | A  | * | 7/1990  | Watanabe ........... A47J 31/0573 219/493 |
| 5,992,300 | A  | * | 11/1999 | Fukushima ............. A47J 31/60 99/279 |
| 7,644,650 | B2 | * | 1/2010  | Suzuki .................. A47J 31/005 99/280 |
| 7,673,557 | B2 | * | 3/2010  | Bienvenu ............ A47J 31/3676 99/290 |
| 7,770,511 | B2 | * | 8/2010  | Yao ..................... B01D 11/0207 126/382.1 |
| 2009/0151573 | A1 | * | 6/2009 | Tonelli .................... A47J 31/46 99/280 |
| 2012/0291633 | A1 | * | 11/2012 | Goeltenboth ......... A47J 31/002 99/280 |

* cited by examiner

*Primary Examiner* — Ibrahime A Abraham
*Assistant Examiner* — John J Norton

(57) ABSTRACT

A hot beverage maker is provided that has a water tank, a boiler, a dispensing device, a water outlet pipe and a control device. The control device of the hot beverage maker has a mechanical configuration that includes a rotatable cam provided inside the case of the hot beverage maker. The cam has bumps arranged in, for example, three circles about a periphery of the cam. Spring leaves are arranged to interact with the cam bumps. The spring leaves are electrically connected to control aspects of the hot beverage maker while the rotational position of the cam also controls other aspects of the hot beverage maker.

10 Claims, 10 Drawing Sheets

HOT BEVERAGE MAKER

CROSS-REFERENCE TO RELATED APPLICATIONS

This application claims priority to and/or benefit from Chinese Application No. 201320585049.9, filed on Sep. 22, 2013, entitled "HOT BEVERAGE MAKER," the specification of which is incorporated by reference herein in its entirety.

TECHNICAL FIELD

The present disclosure relates to a beverage maker and, more particularly, to a hot beverage maker.

BACKGROUND

Along with the improvement of living standards, people's lifestyle is gradually improved. In order to meet consumers' demands for high-quality, convenient and rapid-tempo lives, many kinds of beverage makers have emerged on the market. But the water source of most machines is supplied through a power pump or an air pump, therefore, the price of such machines is generally higher, the dimension of such machines is relatively larger, and the consumers' demands for small-sized and cheap machines cannot be met.

SUMMARY

In view of the defects existing in the prior art, the technical problems to be solved by the present disclosure is to provide a hot beverage maker, whose boiler is supplied with water from a water tank without the need of any power pump or air pump, thereby reducing the production cost and reducing the dimension of the machine.

In order to solve the technical problems above, the present disclosure provides a hot beverage maker, comprising a water tank, a boiler, a dispensing device, a water outlet pipe and a control device;

Wherein, the water tank has an air port and a water outlet port, and the air port opens to the atmosphere;

the highest liquid level of the boiler is lower than the highest liquid level of the water tank; the boiler has a water inlet port, and the water inlet port is connected with the water outlet port of the water tank through a water inlet pipe; a first valve is provided in the water inlet pipe; the dispensing device comprises a first opening, a second opening, a connecting pipeline connected between the first opening and the second opening, and a second valve provided in the connecting pipeline; the first opening opens to the atmosphere, and the second opening is disposed inside the boiler; the water outlet pipe is in communication with an inner cavity of the boiler; the control device is connected with the first valve and the second valve to control open/close of the first valve and the second valve.

In one of the embodiments, the connecting pipeline comprises at least one dispensing pipe, which is upright provided inside the boiler; an opening at a lower end of the dispensing pipe is the second opening, and an opening at an upper end of the dispensing pipe is connected to the second valve.

In one of the embodiments, multiple dispensing pipes are provided, the opening at the lower end of each of the dispensing pipes is disposed at a different level; and the opening at the upper end of each of the dispensing pipes is connected to the second valve respectively.

In one of the embodiments, the connecting pipeline further comprises a ventilating pipe; an opening at one end of the ventilating pipe is the first opening, and an opening at another end is connected to the second valve.

In one of the embodiments, the hot beverage maker further comprises an exhaust pipe and a third valve; the exhaust pipe is in communication with the inner cavity of the boiler, and the third valve is provided in the exhaust pipe; the control device is connected with the third valve to control open/close of the third valve, that is, to control the third valve to be opened or closed.

In one of the embodiments, the control device comprises a cam, PCB spring leaves, a control plate, a driving device and a control circuit; the cam is rotatably provided inside a case of the hot beverage maker, and multiple bumps are arranged on an outer peripheral surface of the cam; the PCB spring leaves matching with corresponding bumps are arranged at one side of the outer peripheral surface of the cam; the PCB spring leaves are electrically connected with the control circuit respectively; a control plate is disposed at one end of the cam, and the control plate is provided with an actuator; each of the first valve, the second valve and the third valve comprises a valve body, a valve spool and a spring; the valve spool is provided inside the valve body; under actions of the spring and the actuator, the valve spool moves between an ON position and an OFF position; and the driving device is configured to drive the cam to rotate and is electrically connected with the control circuit.

In one of the embodiments, the hot beverage maker further comprises a temperature sensor, said temperature sensor is disposed inside the boiler and is connected with the control circuit.

In one of the embodiments, an opening at one end of the water outlet pipe is disposed at a bottom of the inner cavity of the boiler, and an opening at another end of the water outlet pipe is located outside of the inner cavity of the boiler and above the highest liquid level of the boiler.

In one of the embodiments, the water outlet pipe is provided with a fourth valve; and the control device is connected with the fourth valve to control open/close of the fourth valve.

In one of the embodiments, the hot beverage maker further comprises an air pump; an air outlet of the air pump is in communication with the inner cavity of the boiler.

According to the present disclosure, water is fed to the boiler through the dispensing device. When the boiler needs to be fed with water, the user simply turns on the first valve in the water inlet pipe and the second valve in the dispensing device, then the water in the water tank, under the actions of the gravity and the atmosphere, will flow into the boiler automatically and quantitatively. Comparing with the prior art, the hot beverage maker of the present disclosure eliminates the need of any power pump or other water pumping devices, thereby reducing the material cost of the machine, and reducing the dimensions of the machine as well.

Figure 1:
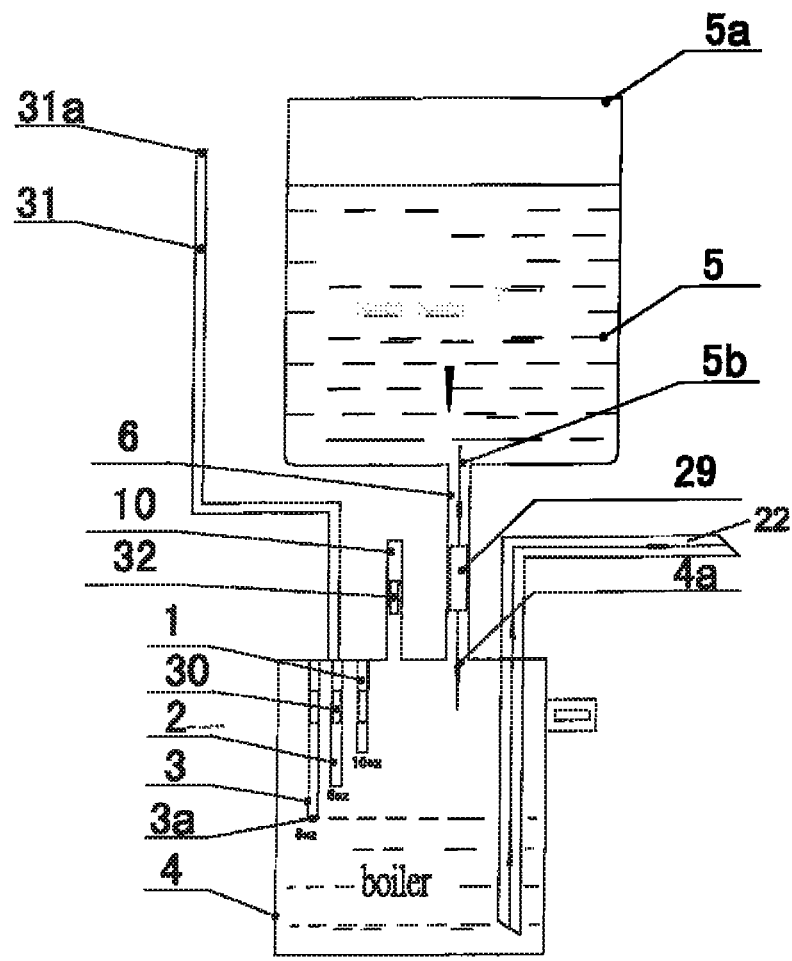
FIG. 1 is a system principle diagram of the hot beverage maker according to one embodiment of the present invention.
Figure 2:
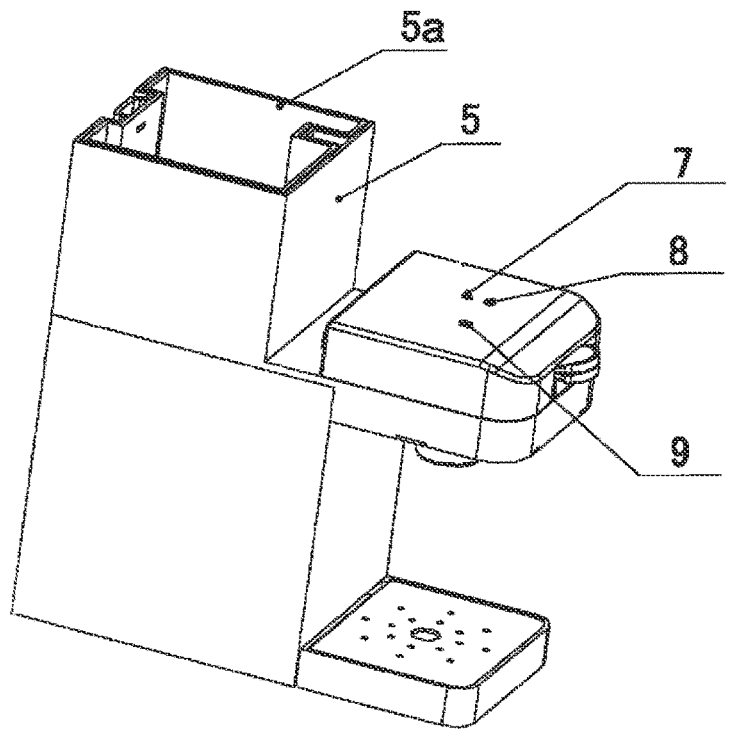
FIG. 2 is an appearance schematic view of the hot beverage maker according to one embodiment of the present invention.
Figure 4:
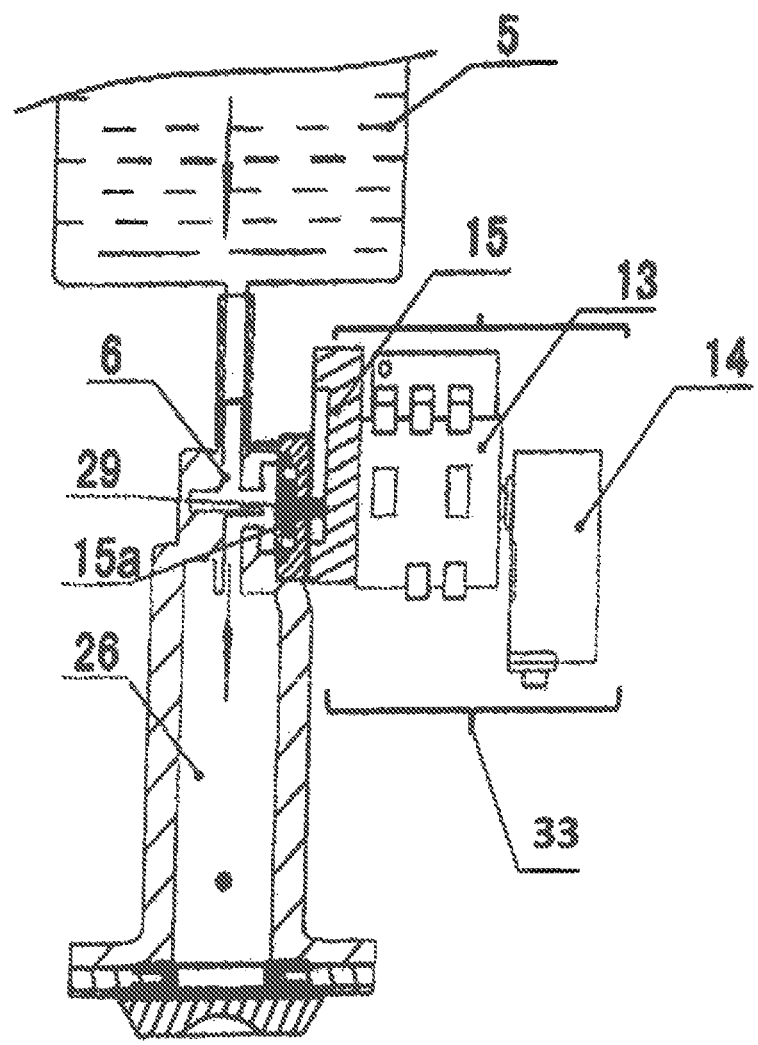
FIG. 4 is a schematic view illustrating the states of the tank and the water inlet pipe of the hot beverage maker according to one embodiment of the present invention, when feeding water to the boiler.

Wherein the elements are denoted as follows:

tank 5, a boiler 4, a dispensing device, a water outlet pipe 22 and a control device. Wherein, the water tank 5 has an air port 5a and a water outlet port 5b. The air port 5a opens to the atmosphere. The highest liquid level of the boiler 4 is lower than the highest liquid level of the water tank 5. The boiler 4 has a water inlet port 4a, and the water inlet port 4a and the water outlet port 5b of the water tank 5 are connected through a water inlet pipe 6. As also shown in FIG. 4, a first valve 29 is provided in the water inlet pipe 6. Preferably, as shown in FIGS. 1 and 2, the boiler 4 is located below the water tank 5.

The dispensing device comprises a first opening 31a, a second opening 3a, a connecting pipeline connected between the first opening 31a and the second opening 3a, and a second valve 30 (also shown in FIG. 5) provided in the connecting pipeline. The first opening 31a opens to the atmosphere, and the second opening 3a is disposed inside the boiler 4. Preferably, the connecting pipeline comprises at least one dispensing pipe, which is provided inside the boiler 4. The opening at the lower end of the dispensing pipe is the second opening 3a, and the opening at the upper end of the dispensing pipe is connected to the second valve 30. Preferably, multiple dispensing pipes are provided. In this embodiment, three dispensing pipes are provided, and they are respectively the first dispensing pipe 1, the second dispensing pipe 2 and the third dispensing pipe 3. The lower end of each pipe is disposed at a different level. Preferably, the connecting pipeline further comprises a ventilating pipe 31. The opening at one end of the ventilating pipe 31 is the first opening 31a, and the opening at the other end is connected to the second valve 30.

Figure 10:
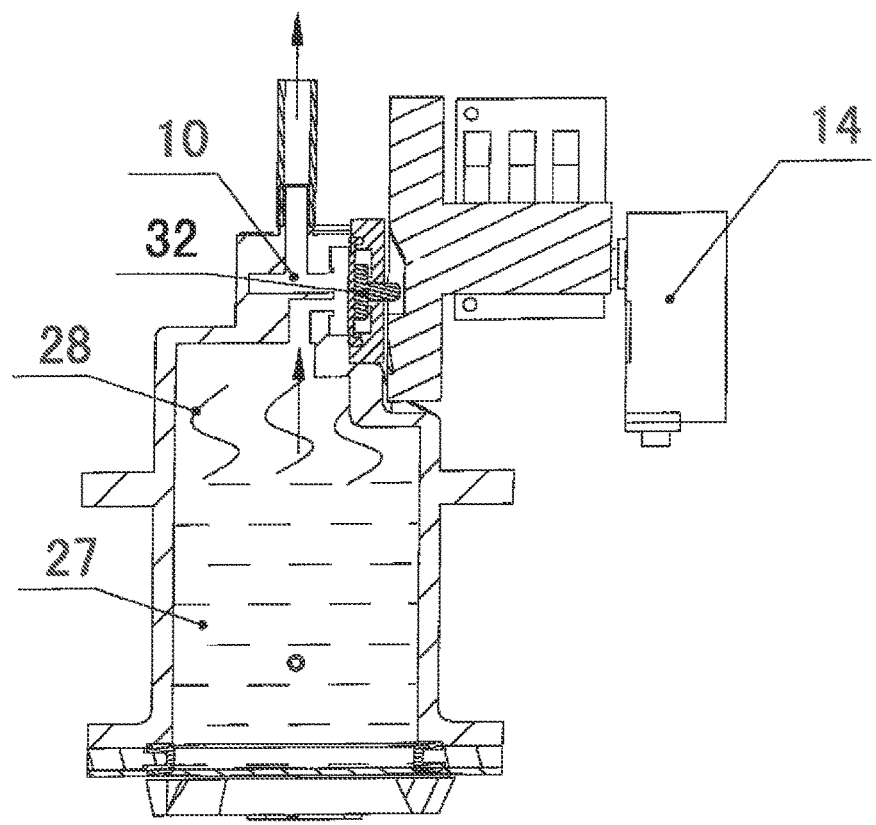
FIG. 10 is a schematic view illustrating the state of the exhaust pipe of the hot beverage maker according to one embodiment of the present invention, when heating the boiler.

Preferably, the hot beverage maker further comprises an exhaust pipe 10 and a third valve 32 (also shown in FIG. 10). The exhaust pipe 10 is in communication with the inner cavity of the boiler 4, and the third valve 32 is provided in the exhaust pipe and is connected with an output terminal of the control device through a signal circuit.

The control device 33 (shown in FIG. 4) comprises a cam 13, PCB spring leaves, a control plate 15, a driving device or synchronous motor 14 and a control circuit. The cam 13 is rotatably provided inside the case of the hot beverage maker, and multiple bumps are arranged on the outer peripheral surface of the cam 13. In this embodiment, three circles

| | | |
|---|---|---|
| 1- first dispensing pipe | 2- second dispensing pipe | 3- third dispensing pipe |
| 3a- second opening | 4- boiler | 4a- water inlet port |
| 5- tank | 5a- air port | 5b- water outlet port |
| 6- water inlet pipe | 7- first cup amount button | 8- second cup amount button |
| 9- third cup amount button | 10- exhaust pipe | 11- first PCB spring leaf |
| 12- first bumps | 13- cam | 14- synchronous motor |
| 15- control plate | 15a- actuator | 16- heating tube |
| 17- second spring lea | 18- second bumps | 19- third PCB spring leaf |
| 20- third bumps | 21- temperature sensor | 22- water outlet pipe |
| 23- coffee powder container | 24- coffee cup | 26- cavity of the boiler |
| 27- heat water in the boiler | 28- vapor pressure in the boiler | 29- first valve |
| 30- second valve | 31- ventilating pipe | 31a- first opening |
| | | 32- third valve |

DETAILED DESCRIPTION

The present disclosure will be described in more details with reference to the accompanying figures and preferred embodiments. It should be noted that, under the condition of causing no conflicts, all embodiments and the features in all embodiments can be combined with each other.

FIG. 1 illustrates a hot beverage maker of one embodiment of the present invention. The hot beverage maker is a coffee maker for making coffee, which comprises a water of bumps, which are first bumps 12, second bumps 18 and third bumps 20 respectively, are arranged peripherally on the outer peripheral surface of the cam 13. The PCB spring leaves matching with corresponding bumps are arranged at one side of the outer peripheral surface of the cam 13; in this embodiment, there are three PCB spring leaves, which are the first PCB spring leaf 11, the second spring leaf 17 and the third spring leaf 19, and which are electrically connected with the control circuit respectively. As shown in FIG. 4, the control plate 15 is disposed at one end of the cam 13, and is provided with an actuator 15a. In this embodiment, the first valve 29, and the second valve 30 and the third valve 32 are all mechanical valves, each of which comprises a valve body, a valve spool and a spring, which are not shown in Figures. Under the actions of the spring and the actuator 15a, the valve spool moves between the ON position where the valve is opened and the OFF position where the valve is closed. The driving device is configured to drive the cam 13 to rotate. In this embodiment, the driving device is a synchronous motor 14, which is electrically connected with the control circuit. Preferably, the control device further comprises cup amount buttons for controlling different volumes of beverage. In this embodiment, as shown in FIG. 2, there are three cup amount buttons, which are respectively the first cup amount button 7, the second cup amount button 8 and the third cup amount button 9. The first cup amount button 7 controls the first dispensing pipe 1, the second cup amount button 8 controls the second dispensing pipe 2 and the third cup amount button 9 controls the third dispensing pipe 3.

Preferably, the hot beverage maker further comprises a temperature sensor 21, which is disposed inside the boiler 4 and is connected with the control circuit.

Preferably, the opening at one end of the water outlet pipe 22 is disposed at the bottom of the boiler 4, and the other opening at the other end of the water outlet pipe 22 is disposed above the highest liquid level of the boiler 4; optionally, the water outlet pipe 22 is provided with a fourth valve (not shown in Figures).

Preferably, the hot beverage maker further comprises an air pump (not shown in Figures). The air outlet of the air pump is in communication with the inner cavity of the boiler 4. The liquid in the boiler is discharged under the air pressure generated by the air pump, or under the air pressure caused by vapor.

Figure 3:
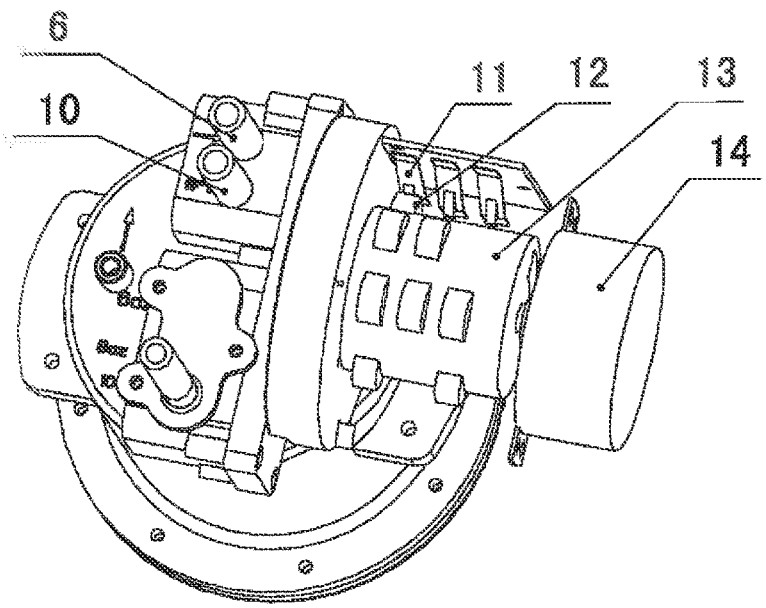
FIG. 3 is a structure schematic view of the control device of the hot beverage maker according to one embodiment of the present invention, illustrating the states of the motor and the cam when feeding water to the boiler.
Figure 5:
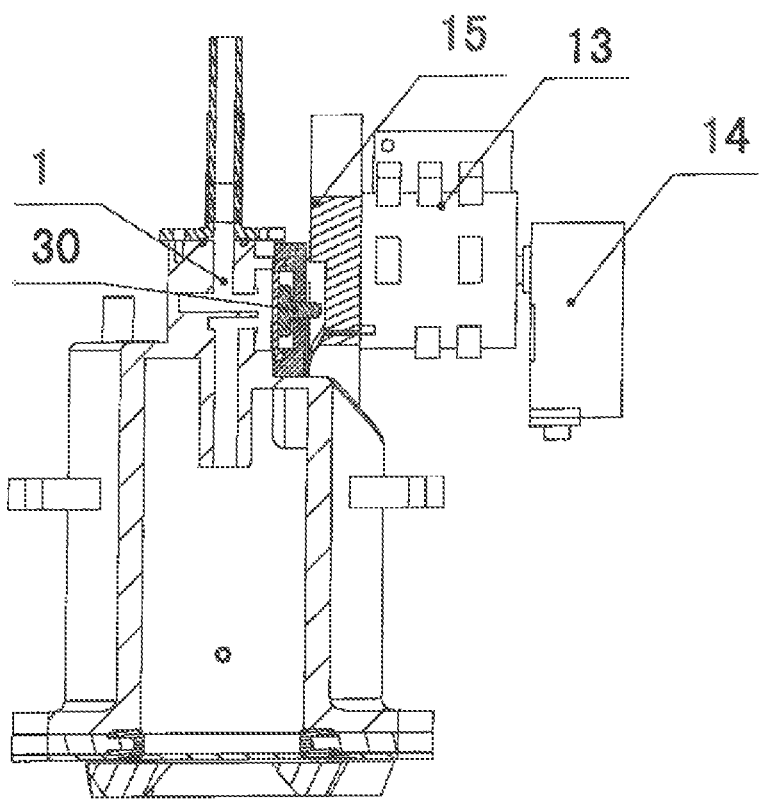
FIG. 5 is a schematic view illustrating the states of the dispensing pipes of the hot beverage maker according to one embodiment of the present invention, when feeding water to the boiler.
Figure 6:
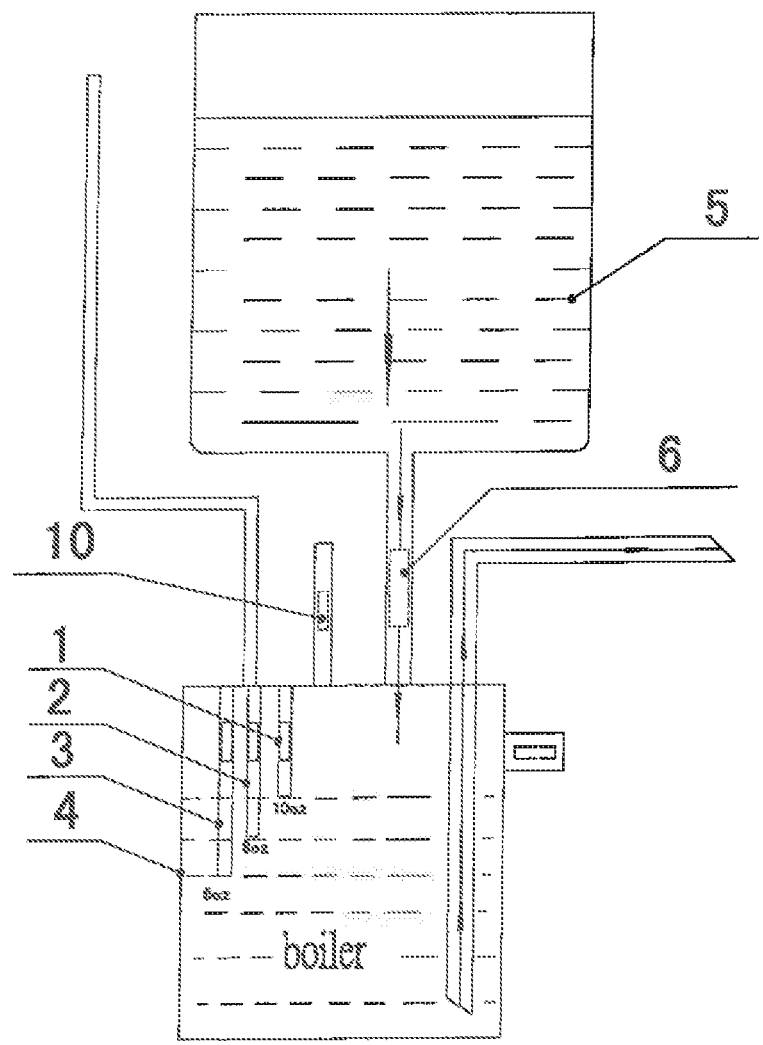
FIG. 6 is a schematic view illustrating the state of all pipes of the hot beverage maker according to one embodiment of the present invention, when the boiler is completely filled with water.
Figure 7:
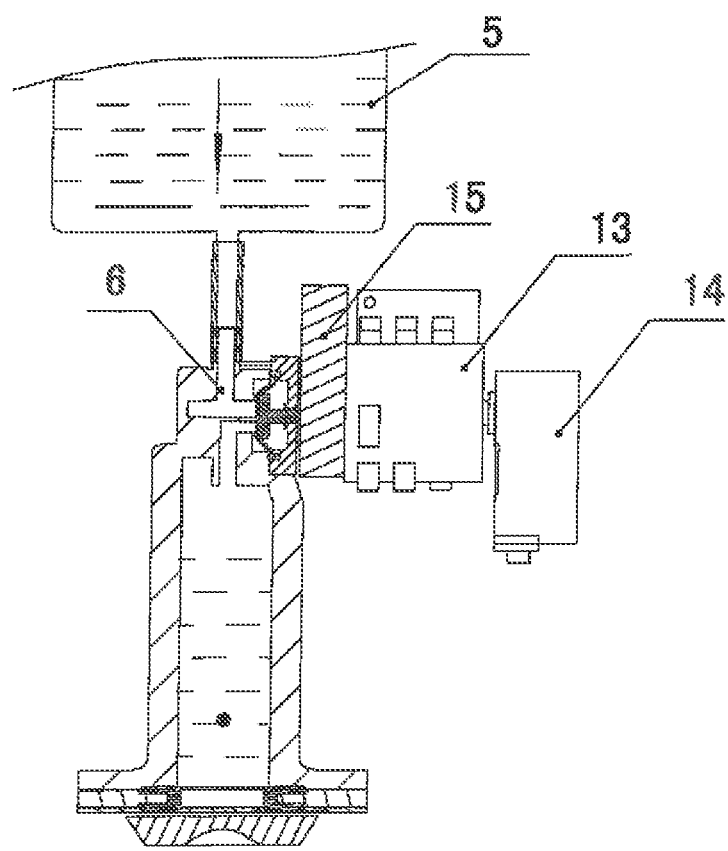
FIG. 7 is a schematic view illustrating the state of the water inlet pipe of the hot beverage maker according to one embodiment of the present invention, when the boiler is completely filled with water.
Figure 8:
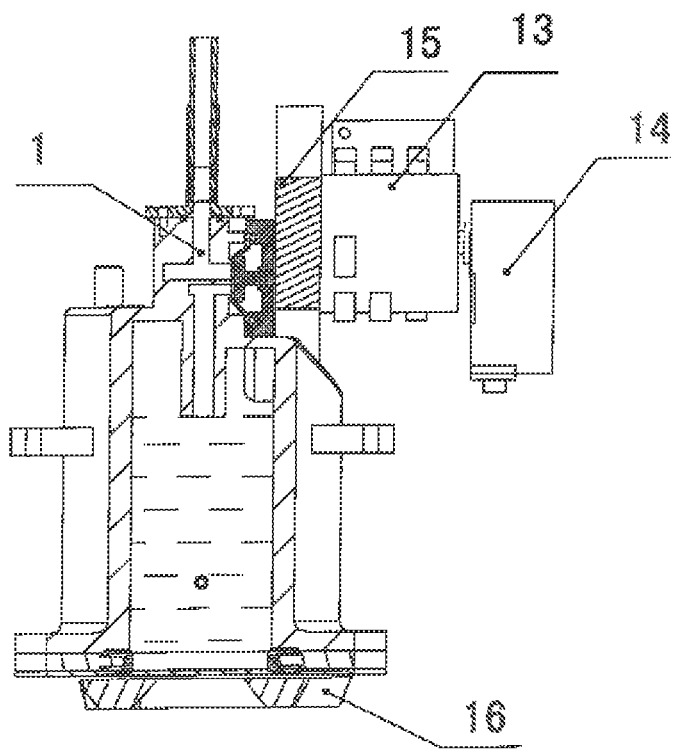
FIG. 8 is a schematic view illustrating the states of the dispensing pipes of the hot beverage maker according to one embodiment of the present invention, when the boiler is completely filled with water.

The operating principles of the hot beverage maker according to this embodiment are as follows:

Select the first cup amount button 7, and the synchronous motor 14 in the machine rotates, driving the cam 13 to rotate, for the cam 13 and the synchronous motor 14 are fixed together. When the first bump 12 on the cam 13 triggers the first PCB spring leaf 11, the synchronous motor 14 will stop rotating. The control plate 15 controlling open/close of each pipe is disposed at one end of the cam 13, the control plate 15 opens the first dispensing pipe 1 and the water inlet pipe 6, and, as shown in FIGS. 3, 4 and 5, the water in the water tank 5 will flow into the inner cavity 26 of the boiler 4 under the action of gravity. The first dispensing pipe 1 is installed inside the boiler 4. As shown in FIGS. 6, 7, and 8, when the water in the boiler 4 is filled to a certain level, the pressure in the boiler 4 and the atmospheric pressure reach a balance, and the water tank 5 will not feed water to the boiler 4 any longer.

Figure 9:
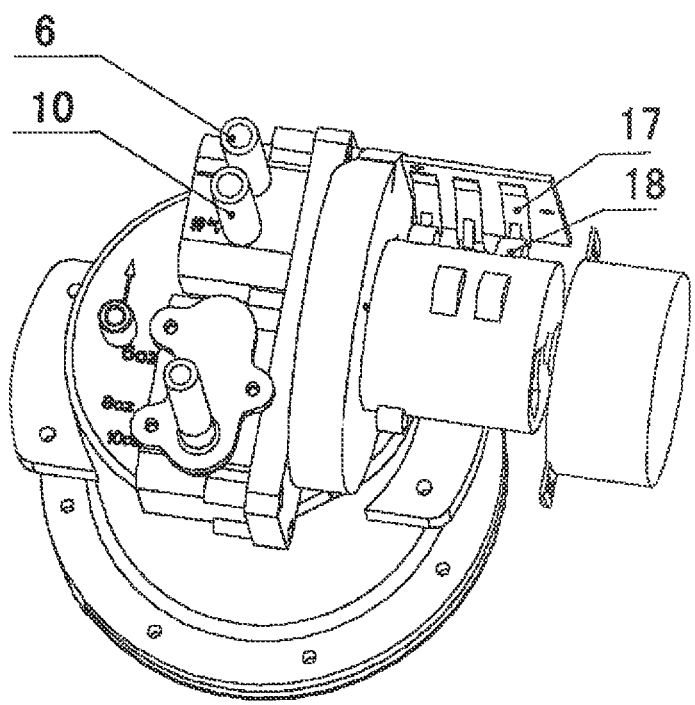
FIG. 9 is a schematic view illustrating the states of the synchronous motor and the cam of the hot beverage maker according to one embodiment of the present invention, when heating the boiler.

The synchronous motor 14 rotates, driving the cam 13 to rotate. The control plate 15 disposed at one end of the cam 13 closes the first dispensing pipe 1 and the water inlet pipe 6, and opens the exhaust pipe 10. Simultaneously, the second bump 18 on the cam 13 triggers the second spring leaf 17 and the heating tube 16 is electrified to heat the water 27 in the boiler 4. As shown in FIGS. 9 and 10, the vapor pressure 28 in the boiler 4 generated by heating is released through the exhaust pipe 10. During heating, the cavity 26 of the boiler is open.

Figure 11:
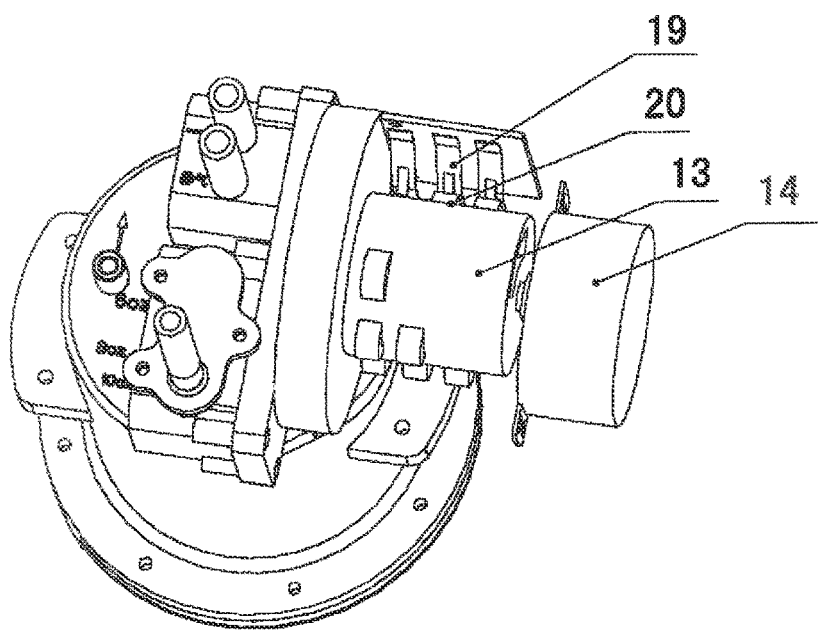
FIG. 11 is a schematic view illustrating the states of the synchronous motor and the cam of the hot beverage maker according to one embodiment of the present invention, when the boiler is heated to certain temperature.
Figure 12:
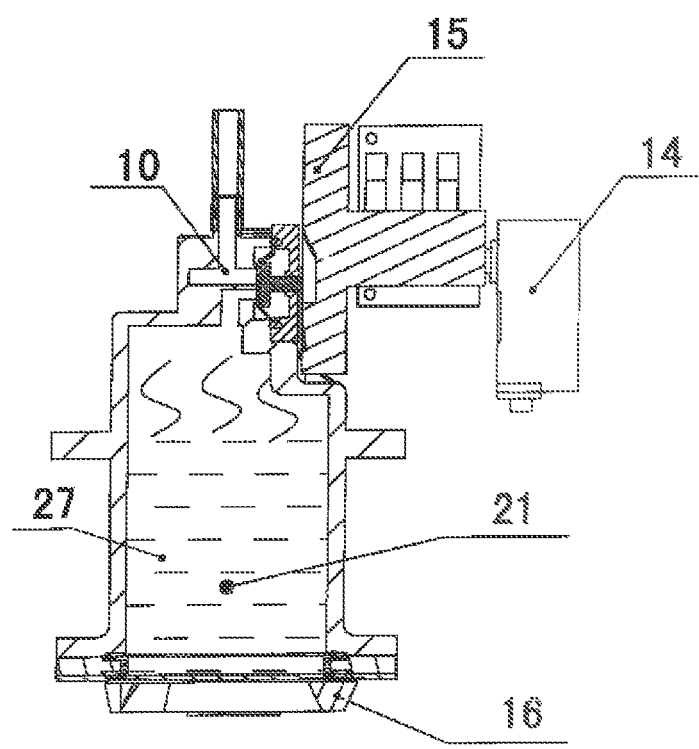
FIG. 12 is a schematic view illustrating the state of the exhaust pipe of the hot beverage maker according to one embodiment of the present invention, when the boiler is heated to a certain temperature.

When the temperature sensor 21 detects that the temperature of the water 27 in the boiler 4 has been heated to the preset temperature, preferably 85 centigrade degrees, the synchronous motor 14 rotates, driving the cam 13 to rotate. As shown in FIGS. 11 and 12, the control plate 15 disposed at one end of the cam 13 closes the exhaust pipe 10, the third bump 20 on the cam 13 triggers the third spring leaf 19 and the synchronous motor 14 stops rotating.

The water inlet pipe 6, the first dispensing pipe 1, the second dispensing pipe 2, the third dispensing pipe 3 and the exhaust pipe 10 are all closed, and under this circumstance, the cavity 26 of the boiler is sealed. The heating tube 16 heats from time to time, supplying heat for the water 27 in the boiler 4 intermittently, and generating vapor pressure 28 in the boiler 4 continuously, so as to force heated water 27 in the boiler 4 to flow out from the water outlet pipe 22. Alternatively, air pressure is generated by means of an air pump, so as to force heated water 27 in the boiler 4 to flow out from the water outlet pipe 22.

Figure 13:
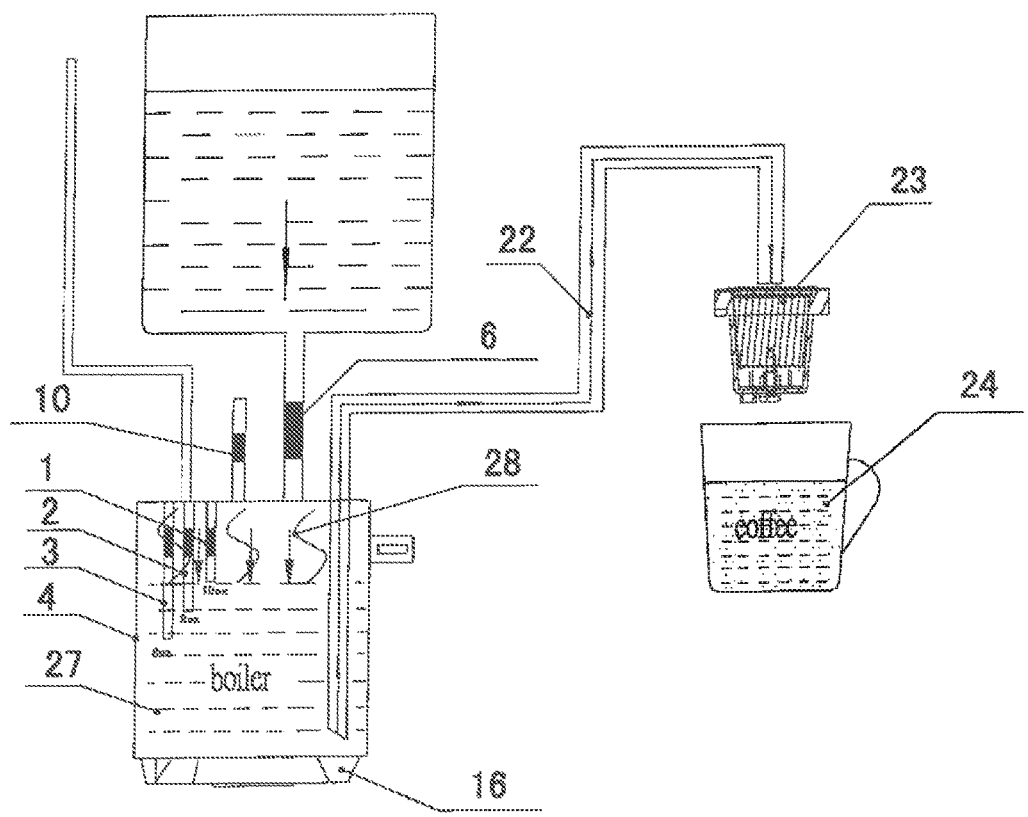
FIG. 13 is a schematic view illustrating the states of all pipes of the hot beverage maker according to one embodiment of the present invention, when water is flowing from the boiler.

The heated water 27 is transported into the coffee powder container 23 through the water outlet pipe 22 to soak the coffee powder. As shown in FIG. 13, coffee is being transported into a coffee cup until no coffee flows into the coffee cup 24, and the coffee is made.

As can be seen from above, as the hot beverage maker of the present disclosure has the structure described above, the processes of feeding water to the boiler 4, heating the boiler 4 and discharging water from the boiler 4 are all realized by controlling the sequences of the opening and closing of each pipe, without the need of any power pump or other water pumping devices, thereby reducing the material cost, and reducing the dimensions of the machine. What's more, the temperature of the water flowing out from the boiler is steady, as a result, the finished coffee has steady temperature and has a good taste.

The preferred embodiments of the present invention above are described specifically and in details, but they are not intended to restrict the present disclosure. It will be understood by those skilled in the art that various modifications and improvements may be made therein without departing from the conceptions of the present disclosure.

What is claimed is:

1. A hot beverage making device, comprising:
a water tank configured to hold a liquid, the water tank having an air port at a top of the water tank that opens to the atmosphere, the water tank comprises a water outlet port;
a boiler tank configured for holding and heating the liquid to a temperature, the boiler tank being positioned such that a highest liquid level of the boiler tank is lower than a highest liquid level of the water tank; the boiler tank comprises a water inlet port;
a water inlet pipe connected between the water outlet port of the water tank and the water inlet port of the boiler, the water inlet pipe comprising a first valve configured to control a flow of liquid from the water tank to the boiler tank;
a liquid dispensing device, comprising:
a first opening that opens to the atmosphere;
a second opening disposed at a first predetermined level inside the boiler tank;
a connecting pipeline connected between the first opening and the second opening; and
a second valve provided in the connecting pipeline configured to selectively open and close the connecting pipeline;
a water outlet pipe in communication with an inner cavity of the boiler tank; and
a control device connected to the first valve and the second valve, the control device configured to open and close the first valve and the second valve; the control device comprises a mechanical configuration, the mechanical configuration comprises:
a cam rotatably positioned inside the control device, the cam comprises bumps arranged on the peripheral surface of the cam, the cam having a first and a second end;
spring leaf switches positioned to be moved to open and closed by corresponding bumps arranged on the peripheral surface of the cam, each spring leaf switch is electrically connected to a control circuit of the control device;
a control plate disposed at the first end of the cam, the control plate comprising an actuator surface configured to mechanically open and close the first, second and a third valve based on the rotational position of the cam and control plate, the third valve being an exhaust valve; and
a motor disposed proximate to the second end of the cam, the motor configured to drive the cam to rotate to predetermined rotational positions; and wherein the control circuit is electrically connected to the motor.

2. The hot beverage making device of claim 1, wherein the connecting pipeline comprises at least one dispensing pipeline extending upright inside the boiler tank such that an opening at the lower end of the at least one dispensing pipeline is the second opening and an opening at the upper end of the at least one dispensing pipeline is the first opening, the first opening being proximate to the second valve.

3. The hot beverage making device of claim 1, wherein the connecting pipeline comprises a plurality of dispensing pipes each extending upright inside the boiler and each having a second opening at their lower end, wherein the lower end of each dispensing pipe is disposed at a different level inside the inner cavity of the boiler tank, and wherein the upper end of one of the dispensing pipes is connected to the second valve.

4. The hot beverage making device of claim 1, wherein the connecting pipeline further comprises a ventilation pipe extending from the second valve to the first opening.

5. The hot beverage making device of claim 1, further comprising:
an exhaust pipe that is in communication with the inner cavity of the boiler; and
the third valve configured to open and close the exhaust pipe to the atmosphere, the control device further connected to the third valve and configured to open and close the third valve.

6. The hot beverage making device of claim 5, wherein each of the first, second and third valves comprise a valve body, a valve spool and a spring such that each of the first, second and third valves are opened and closed based on the actions of their respective spring and the actuator surface.

7. The hot beverage making device of claim 1, further comprising an air pump configured to provide air pressure to the inner cavity of the boiler tank when turned on by the control device and when the first, second and third valves are closed.

8. The hot beverage making device of claim 1, further comprising a fourth valve on the water outlet pipe, the fourth valve being connected to the control device such that the fourth valve opens when the liquid inside the boiler tank reaches a predetermined temperature and the first, second and third are closed.

9. The hot beverage making device of claim 1, further comprising a temperature sensor disposed inside the boiler tank, the temperature sensor being electrically connected to the control circuit to provide a temperature indication, the control circuit is configured to rotate the cam, via the motor, to a predetermined position to open the third valve while liquid in the boiler tank is being heated.

10. The hot beverage making device of claim 1, wherein an opening at one end of the water outlet pipe is disposed proximate to the bottom of the inner cavity of the boiler and another end of the water outlet pipe is located outside of the inner cavity of boiler tank and above the highest liquid level of the boiler tank.

* * * * *